United States Patent
Martin et al.

(10) Patent No.: US 12,262,239 B2
(45) Date of Patent: Mar. 25, 2025

(54) METHODS FOR RELAXATION OF RADIO LINK MONITORING REQUIREMENTS IN WIRELESS SYSTEMS

(71) Applicant: InterDigital Patent Holdings, Inc., Wilmington, DE (US)

(72) Inventors: Brian Martin, Farnham (GB); Virgil Comsa, Montreal (CA); Erdem Bala, East Meadow, NY (US); Keiichi Kubota, Setagaya-Ku (JP)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/678,534

(22) Filed: May 30, 2024

(65) Prior Publication Data
US 2024/0314617 A1    Sep. 19, 2024

Related U.S. Application Data

(63) Continuation of application No. PCT/US2022/082147, filed on Dec. 21, 2022.
(Continued)

(51) Int. Cl.
*H04W 24/10* (2009.01)

(52) U.S. Cl.
CPC .................. *H04W 24/10* (2013.01)

(58) Field of Classification Search
CPC .................................................. H04W 24/10
See application file for complete search history.

(56) References Cited

U.S. PATENT DOCUMENTS

2018/0049053 A1* 2/2018 Kaikkonen ............ H04W 24/08
2019/0288750 A1* 9/2019 Nagaraja ........... H04W 56/0065
(Continued)

FOREIGN PATENT DOCUMENTS

| EP | 4050928 A1 | 8/2022 |
| EP | 4106384 A1 | 12/2022 |

(Continued)

OTHER PUBLICATIONS

Third Generation Partnership Project (3GPP), "Further Details on RRM Measurement Relaxation", Nokia, Nokia Shanghai Bell, 3GPP TSG-RAN WG2 Meeting #108, Reno, USA, Nov. 18-22, 2019, R2-1915522, 5 pages.
(Continued)

*Primary Examiner* — Chi H Pham
*Assistant Examiner* — Raul Rivas
(74) *Attorney, Agent, or Firm* — Flaster Greenberg, P.C.

(57) ABSTRACT

A wireless transmit/receive unit (WTRU) may comprise a processor and memory. The processor and memory may be configured to receive configuration information indicating measurement relaxation criteria for radio link monitoring (RLM) or beam failure detection (BFD) and a prohibit time period for reporting a measurement relaxation state. The WTRU may determine that the measurement relaxation state of the WTRU has changed based on the measurement relaxation criteria. The WTRU may determine that the prohibit time period has ended. The WTRU may send a report based on the determination that the measurement relaxation state has changed and the determination that the prohibit time period has ended. The report may include an indication of a measurement relaxation state.

18 Claims, 7 Drawing Sheets

Related U.S. Application Data

(60) Provisional application No. 63/292,293, filed on Dec. 21, 2021.

(56) References Cited

U.S. PATENT DOCUMENTS

| | | |
|---|---|---|
| 2022/0225147 A1 | 7/2022 | Chen |
| 2022/0394535 A1 | 12/2022 | Li |

FOREIGN PATENT DOCUMENTS

| | | |
|---|---|---|
| WO | 2020225161 A1 | 11/2020 |
| WO | WO 2021/078240 A1 | 4/2021 |
| WO | WO 2021/163951 A1 | 8/2021 |

OTHER PUBLICATIONS

Third Generation Partnership Project (3GPP), "Discussion on UE Reporting for RLM BFD Relaxation", NEC, 3GPP TSG-RAN WG2 Meeting #118, Online, May 9-May 20, 2022, R2-2204888, 7 pages.

Third Generation Partnership Project (3GPP), "Relaxed RLM and BFD Measurements", Ericsson, 3GPP TSG-RAN2 Meeting #118-e, eMeeting, May 9-20, 2022, R2-2206045, 10 pages.

Third Generation Partnership Project (3GPP), "LS on Criteria for RLM/BFD Relaxation", RAN WG4, 3GPP TSG RAN WG2#116-e, e-Meeting, Nov. 1-12, 2021, R2-2109362, 2 pages.

Third Generation Partnership Project (3GPP), "LS on Criteria for RLM/BFD Relaxation", RAN WG4, 3GPP TSG-RAN WG4 Meeting # 100-e, Electronic Meeting, Aug. 16-27, 2021, R4-2115349, 2 pages.

Third Generation Partnership Project (3GPP), "RLM/BFD Relaxation Criteria and Configurations", Qualcomm Incorporated, 3GPP TSG-RAN WG2 Meeting #116-e, Online, Nov. 1-12, 2021, R2-2109454, 3 pages.

Third Generation Partnership Project (3GPP), "Signalling Aspects for RLM/BFD Relaxation", Intel Corporation, 3GPP TSG RAN WG2 Meeting #116-e, E-Meeting, Nov. 1-12, 2021, R2-2109879, 3 pages.

Third Generation Partnership Project (3GPP), "RAN2 Impacts on RLM/BFD Relaxation for Power Saving", Vivo, 3GPP TSG-RAN WG2 Meeting #116-e, Electronic, Nov. 1-Nov. 12, 2021, R2-2109739, 8 pages.

Third Generation Partnership Project (3GPP), "Discussion on Rlm Bfd Measurement Relaxation", Xiaomi Communications, 3GPP TSG-RAN WG2 Meeting #116, Online, Nov. 1-Nov. 12, 2021, R2-2110194, 5 pages.

Third Generation Partnership Project (3GPP), "Discussion on Criteria for the RLM/BFD relaxation", Huawei, HiSilicon, 3GPP TSG-RAN WG2 Meeting #116 electronic, Online, Nov. 1-12, 2021, R2-2110541, 4 pages.

Third Generation Partnership Project (3GPP), "Configurations for RLM/BFD Relaxation", CATT, 3GPP TSG-RAN WG2 Meeting #116 electronic, Online, Nov. 1-12, 2021, R2-2110404, 3 pages.

Third Generation Partnership Project (3GPP), "Other Aspects on UE Power Saving", Ericsson, 3GPP TSG-RAN2 Meeting #116-e, eMeeting, Nov. 1-12, 2021, R2-2110414, 3 pages.

Third Generation Partnership Project (3GPP), "Summary of [AT116-e][036] [ePowSav] RLM/BFD Relaxation (Xiaomi)", Xiaomi, 3GPP TSG-RAN WG2 Meeting #116-e, Online, Nov. 1-12, 2021, R2-2111528, 17 pages.

Third Generation Partnership Project (3GPP), "WF on RLM/BFD Relaxation for UE Power Saving Enhancements", Moderator (MediaTek inc.), 3GPP TSG-RAN WG4 Meeting # 101-e, Electronic Meeting, Nov. 1-12, 2021, R4-2120313, 9 pages.

Third Generation Partnership Project (3GPP), "Physical Channels and Modulation", Technical Specification Group Radio Access Network; NR, Release 16, 3GPP TS 38.211 V16.8.0, Dec. 2021, 134 pages.

Third Generation Partnership Project (3GPP), "Multiplexing and Channel Coding", Technical Specification Group Radio Access Network; NR, Release 16, 3GPP TS 38.212 V16.8.0, Dec. 2021, 153 pages.

Third Generation Partnership Project (3GPP), "Physical Layer Procedures for Control", Technical Specification Group Radio Access Network; Release 16, NR, 3GPP TS 38.213 v16.8.0, Dec. 2021, 189 pages.

Third Generation Partnership Project (3GPP), "Physical Layer Procedures for Data", Technical Specification Group Radio Access Network; NR, Release 16, 3GPP TS 38.214 v16.8.0, Dec. 2021, 172 pages.

Third Generation Partnership Project (3GPP), "Medium Access Control (MAC) Protocol Specification", Technical Specification Group Radio Access Network; NR, Release 16, 3GPP TS 38.321 v16.7.0, Dec. 2021, 158 pages.

Third Generation Partnership Project (3GPP), "Radio Resource Control (RRC) Protocol Specification", Technical Specification Group Radio Access Network; NR, Release 16, 3GPP TS 38.331 16.7.0, Dec. 2021, 963 pages.

Third Generation Partnership Project (3GPP), "User Equipment (UE) Procedures in Idle Mode and RRC Inactive State", Technical Specification Group Radio Access Network; NR, Release 16, 3GPP TS 38.304 16.7.0, Dec. 2021, 39 pages.

* cited by examiner

METHODS FOR RELAXATION OF RADIO LINK MONITORING REQUIREMENTS IN WIRELESS SYSTEMS

RELATED APPLICATION

This application is a continuation of International Application No. PCT/2022/082147, filed on Dec. 21, 2022, which claims the benefit of U.S. Provisional Patent Application No. 63/292,293, filed on Dec. 21, 2021, the entire contents of which are incorporated herein by reference.

BACKGROUND

In 5G New Radio, a wireless transmit/receive unit (WTRU) monitors the downlink radio link quality based on the reference signal configured as RLM-RS resource(s) to detect the downlink radio link quality of the primary cell (PCell) and primary and secondary cell (PSCell). The configured radio link monitoring radio signal (RLM-RS) resources can be all synchronization signal blocks (SSBs), or all CSI-RSs, or a mix of SSBs and channel state information resource signals (CSI-RSs). The WTRU is not required to perform RLM outside the active downlink bandwidth part (DL BWP). Similarly, the WTRU assess the downlink radio link quality of a serving cell to detect beam failure.

SUMMARY

In one or more methods, systems, and/or apparatus, there may be the relaxation of radio link monitoring in wireless systems. In some cases, there may be the use of MAC CE or L1 signaling to report in an uplink and/or enable/disable in a downlink dynamically giving the network control. In some cases, abbreviated uplink reports indicating simple binary conditions may be used, concerning whether the report or relaxation criteria is met. For example, the report may be a single bit. For example, the report may include a limited number of multiple bits to provide more information, such as whether individual criteria are met. In some cases, dynamic downlink control may be used with simple on/off and/or up/down commands from the network indicating one or more measurement requirements.

A wireless transmit/receive unit (WTRU) may comprise a processor and memory. The processor and memory may be configured to receive configuration information indicating measurement relaxation criteria for radio link monitoring (RLM) or beam failure detection (BFD) and a prohibit time period for reporting a measurement relaxation state. The WTRU may determine that the measurement relaxation state of the WTRU has changed based on the measurement relaxation criteria. The WTRU may determine that the prohibit time period has ended. The WTRU may send a report based on the determination that the measurement relaxation state has changed and the determination that the prohibit time period has ended. The report may include an indication of a measurement relaxation state.

The WTRU may start the prohibit time period when the WTRU sends the report. The WTRU may be prohibited from changing the measurement relaxation state while the prohibit timer is running.

The report may indicate whether the WTRU is in the measurement relaxation state or that the WTRU is not in the measurement relaxation state. The indication of the measurement relaxation state may be specific to a first cell. The report may further include an indication of the measurement relaxation state specific to a second cell. The WTRU may receive signalling that enables the WTRU to send the report. In some examples, the signalling that enables the WTRU to send the report may be the same signalling as that which provides the prohibit time period.

The configuration information may indicate a prohibit time period out of a plurality of prohibit time periods.

The WTRU may perform RLM and/or BFD measurements using a first periodicity when the WTRU is not in the measurement relaxation state. The WTRU may perform RLM and/or BFD measurements using a second periodicity when the WTRU is in the measurement relaxation state.

The WTRU may determine to enter the measurement relaxation state based on a power measurement value being above a power threshold. The power threshold may include one or more of an SINR threshold, an RSRP threshold, an RSSI threshold, or a RSRQ threshold. The WTRU may determine to enter the measurement relaxation state based on a variation of power measurement values being below a variation/mobility threshold. The mobility threshold may include a change of RSRP within a specific time limit and/or a cell change count. The WTRU may determine to exit the measurement relaxation state based on a power measurement value being below a power threshold.

A method implemented the WTRU may include receiving configuration information indicating measurement relaxation criteria for radio link monitoring (RLM) or beam failure detection (BFD) and a prohibit time period for reporting a measurement relaxation state. The method may include determining that the measurement relaxation state of the WTRU has changed based on the measurement relaxation criteria. The method may include determining that the prohibit time period has ended. The method may include sending a report based on the determination that the measurement relaxation state has changed and the determination that the prohibit time period has ended. The report may be including an indication of a measurement relaxation state.

The method may be further including starting the prohibit time period when the WTRU sends the report. The method may be further including prohibiting changing the measurement relaxation state while the prohibit timer, which may track the prohibit time period, is running.

The report may indicate whether the WTRU is in the measurement relaxation state or that the WTRU is not in the measurement relaxation state.

The method may include indicating that the measurement relaxation state is specific to a first cell. The method may include indicating that the measurement relaxation state is specific to a second cell.

The method may include receiving signalling that enables the WTRU to send the report. The configuration information may indicate a prohibit time period out of a plurality of prohibit time periods.

The method may include performing RLM or BFD measurements using a first periodicity when the WTRU is not in the measurement relaxation state. The method may include performing RLM or BFD measurements using a second periodicity when the WTRU is in the measurement relaxation state. The method may include determining to enter the measurement relaxation state based on a power measurement value being above a power threshold. The method may include determining to exit the measurement relaxation state based on a power measurement value being below a power threshold.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
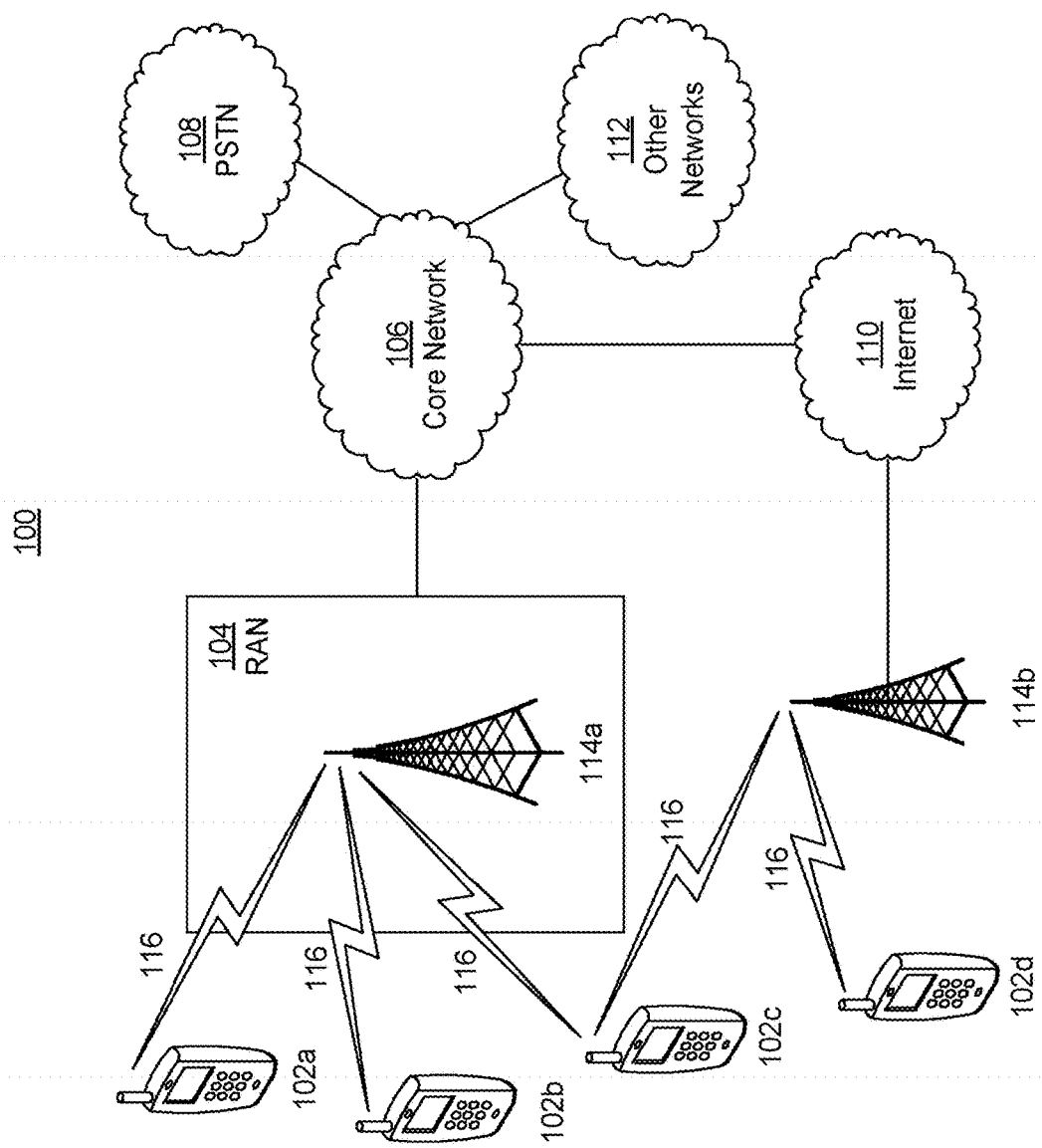
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
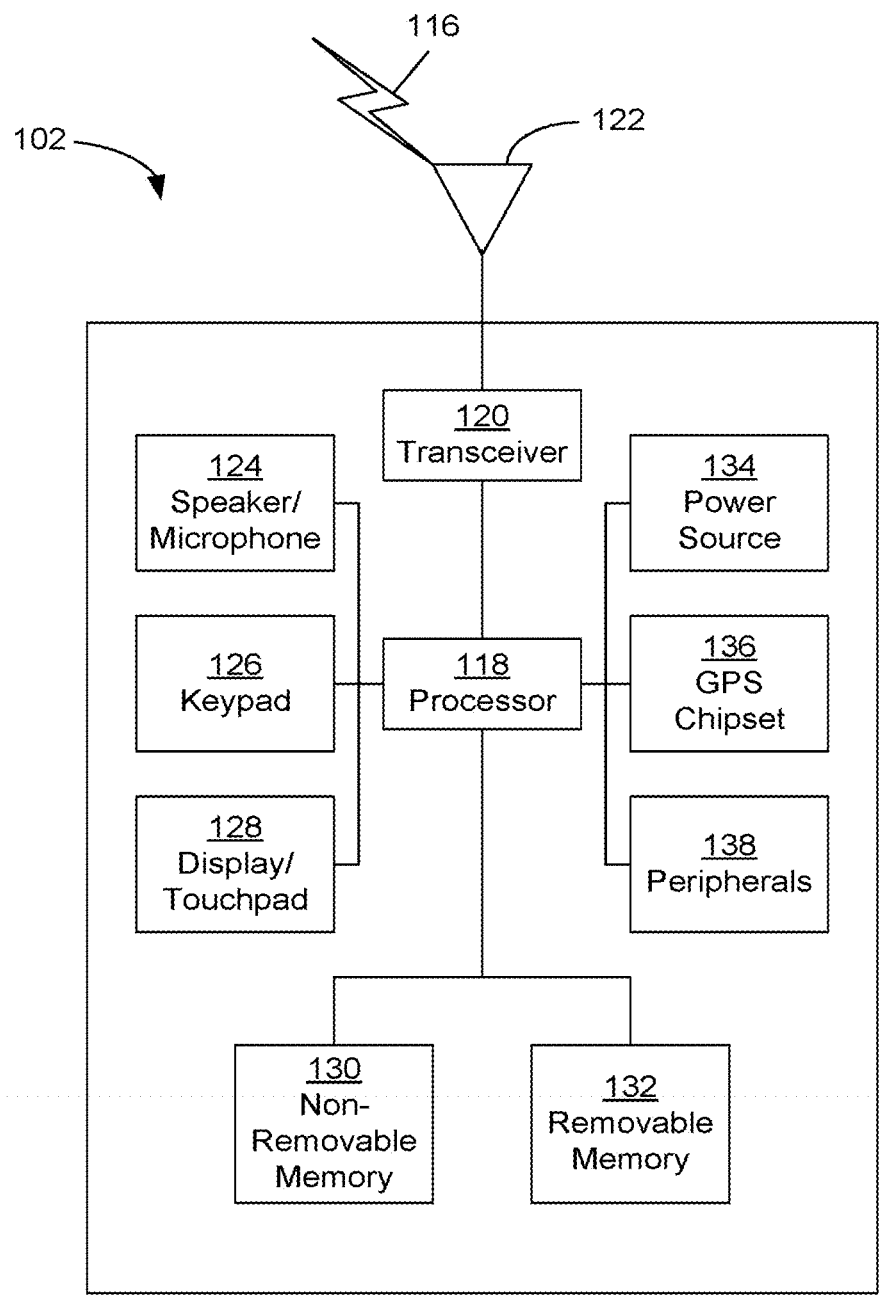
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
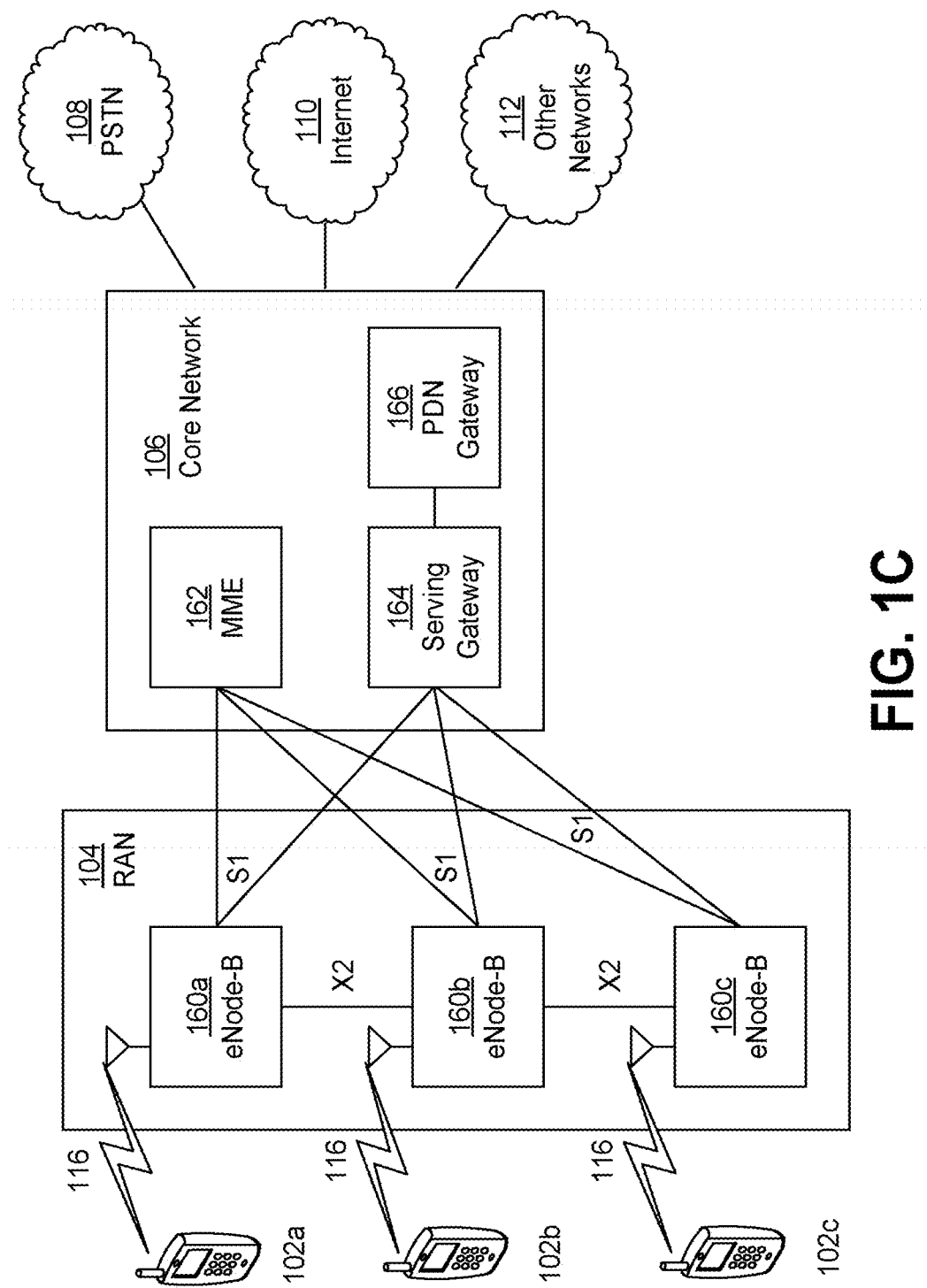
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
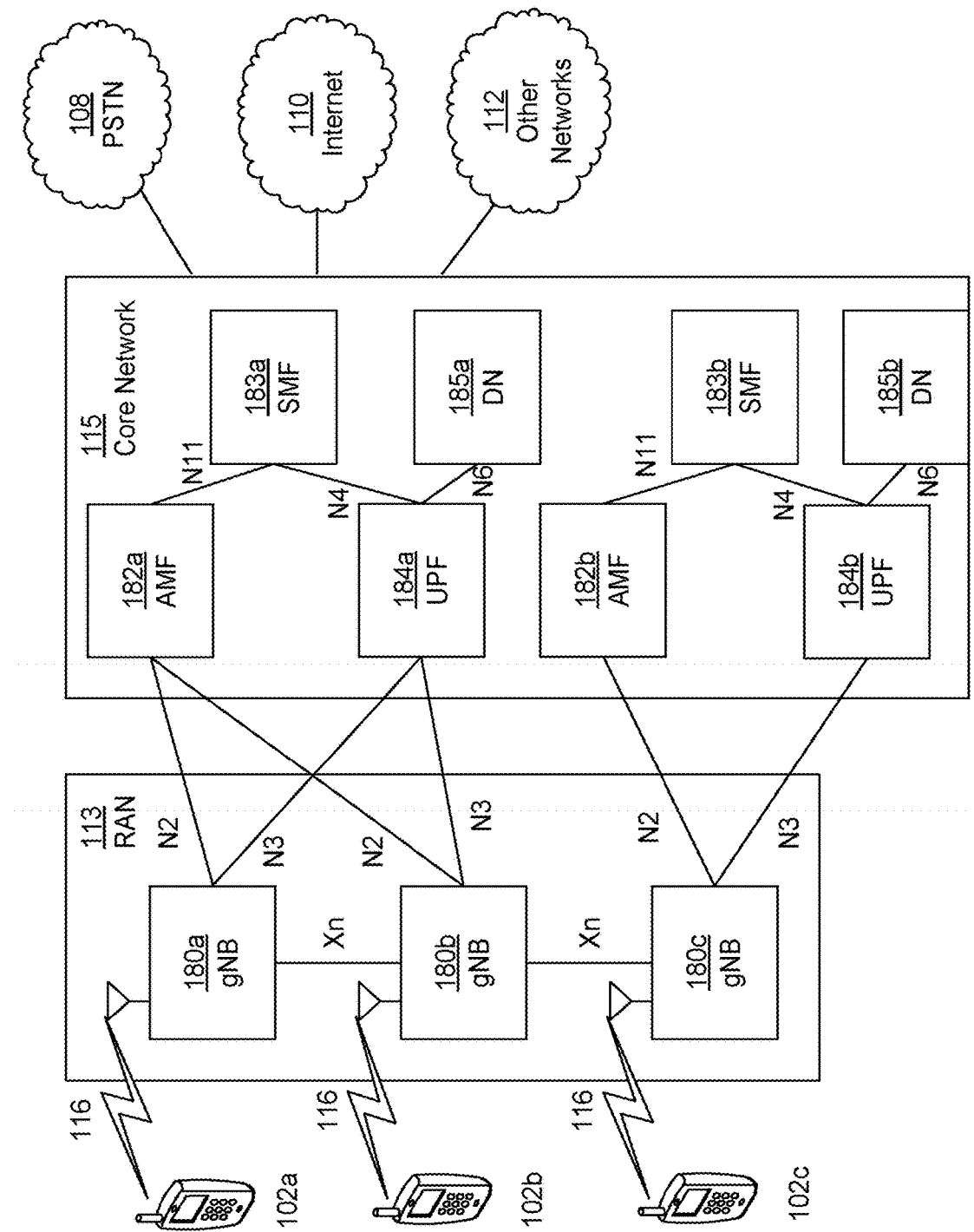
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In wireless systems (e.g., 5G New Radio (NR)), the WTRU may monitor the downlink radio link quality based on the reference signal configured as radio link monitoring reference signal (RLM-RS) resource(s) to detect the downlink radio link quality of the primary cell (PCell) and primary and secondary cell (PSCell). The configured RLM-RS resources may be all synchronization signal blocks (SSBs), all channel state information reference signals (CSI-RSs), or a mix of SSBs and CSI-RSs. The WTRU may not be required to perform RLM outside the active downlink bandwidth part (DL BWP). Similarly, the WTRU may assess the downlink radio link quality of a serving cell to detect beam failure.

One method to save power may include the WTRU relaxing the RLM/BFD requirements. There may be one or more criteria for RLM/BFD relaxation, that may address one or more cases. In examples, there may be SSB based RLM/BFD measurement relaxation in frequency range 1 (FR1). In examples, there may be CSI-RS based RLM/BFD measurement relaxation in FR1. In examples, there may be CSI-RS based RLM/BFD measurement relaxation in frequency range 2 (FR2). In examples, there may be SSB based RLM/BFD measurement relaxation in FR2.

Relaxed BFD/RLM requirements may be supported for all deployment scenarios, such as new radio standalone (NR SA), E-UTRA-NR dual connectivity (EN-DC), NR-E-UTRA dual connectivity (NE-DC), NR intra-band carrier aggregation (CA), NR inter-band CA and new radio dual connectivity (NR-DC).

For the relaxation criteria, one or more of the following factors may apply and/or may be considered. For example, relaxation criteria may consider the network to enable and disable measurement relaxation. In examples, whether relaxed RLM/BFD requirements can be applied may depend on both the serving cell quality and WTRU mobility state. In examples, the measurement relaxation criteria may be based on channel quality and/or mobility. In examples, the relaxation criteria may also consider that if the WTRU fulfills any of the serving cell quality exit condition(s), low mobility exit condition(s), and/or the DRX cycle length is not allowed for relaxation, then the WTRU may exit relaxation mode. The WTRU may perform measurements for a certain time period when not I the relaxation state and then may perform additional measurements after entering the relaxation state. In examples, if the WTRU applies a DRX cycle longer than 80 ms, the WTRU may be assumed to not perform relaxed RLM/BFD measurements and the existing RLM/BFD requirements may apply. In examples, when neither serving cell quality criteria nor low mobility criteria is configured, the existing RLM/BFD requirements may apply. In examples, one or more of the prior list(s) may be revised if dedicated or broadcast signaling to indicate the WTRU that the WTRU may relax the RLM/BFD measurements. In some examples, one or more of the prior list(s) may be revised if good serving cell criteria is predefined.

The WTRU may determine to enter the measurement relaxation state based on a power measurement value (e.g., RSRP) being above a power threshold (e.g., being above the power threshold indicates high channel quality). The power threshold may include one or more of an SINR threshold, an RSRP threshold, an RSSI threshold, or a RSRQ threshold. Additionally and alternatively, the WTRU may determine to enter the measurement relaxation state based on a variation of power measurement values (e.g., RSRP variation) being below a variation/mobility threshold (e.g., being below the variation threshold indicates low mobility of the WTRU). The variation/mobility threshold may include a change of RSRP within a specific time limit and/or a cell change count. The WTRU may determine to exit the measurement relaxation state based on a power measurement value (e.g., RSRP) being below the power threshold and/or based on a variation of power measurement values being above the variation/mobility threshold. For a low mobility criterion, one or more of the following may apply and/or may be considered, (e.g. L3 reference signal receive power (RSRP) measurement variation and/or the related RS measurements for the L3 RSRP measurement).

For the cell quality criterion, one or more of the following may apply and/or may be considered: good serving cell quality criteria of RLM/BFD relaxation may be defined when the radio link quality is better than a threshold (e.g., the radio link quality in a good serving cell quality criteria for RLM/BFD relaxation may be based on signal to interference noise ratio (SINR)). In examples, the WTRU may reuse the SINR for RLM/BFD evaluation when determining whether the serving cell quality criteria is fulfilled or not. the WTRU may use a predefined or a configured threshold. The SINR definition for good serving cell quality may have one or more criteria of its own.

RLM/BFD relaxation criteria may be configured by dedicated signaling (e.g., RadioLinkMonitoringConfig) as a baseline if parameters are used instead of predefined and/or implementation specific scenarios. Access stratum (AS) capability procedure may be used to report WTRU capability of supporting RLM/BFD relaxation. The presence and/or absence of configuration for RLM/BFD relaxation criteria in signaling may indicate to the WTRU whether the WTRU can and/or should evaluate the criteria.

In examples, issues may arise regarding whether the network (NW) needs to control when the WTRU enters a relaxed state. In one example, radio resource control (RRC) signaling may be used to report and enable the relaxed state. However, this approach may create unwanted overhead for doing enable/disable in a dynamic manner whenever criteria is met.

In an example, medium access control-control element (MAC CE) and/or L1 signaling may be used (e.g., by the NW) to enable/disable RLM/BFD relaxation dynamically. The WTRU may be configured to receive signaling that enable the WTRU to send a report. For example, a MAC CE and/or L1 signaling may be used by the WTRU to send a report associated to RLM/BFD relaxation to the NW, such as, e.g., a report that contains an indication of whether relaxation criteria have been met.

Figure 2:
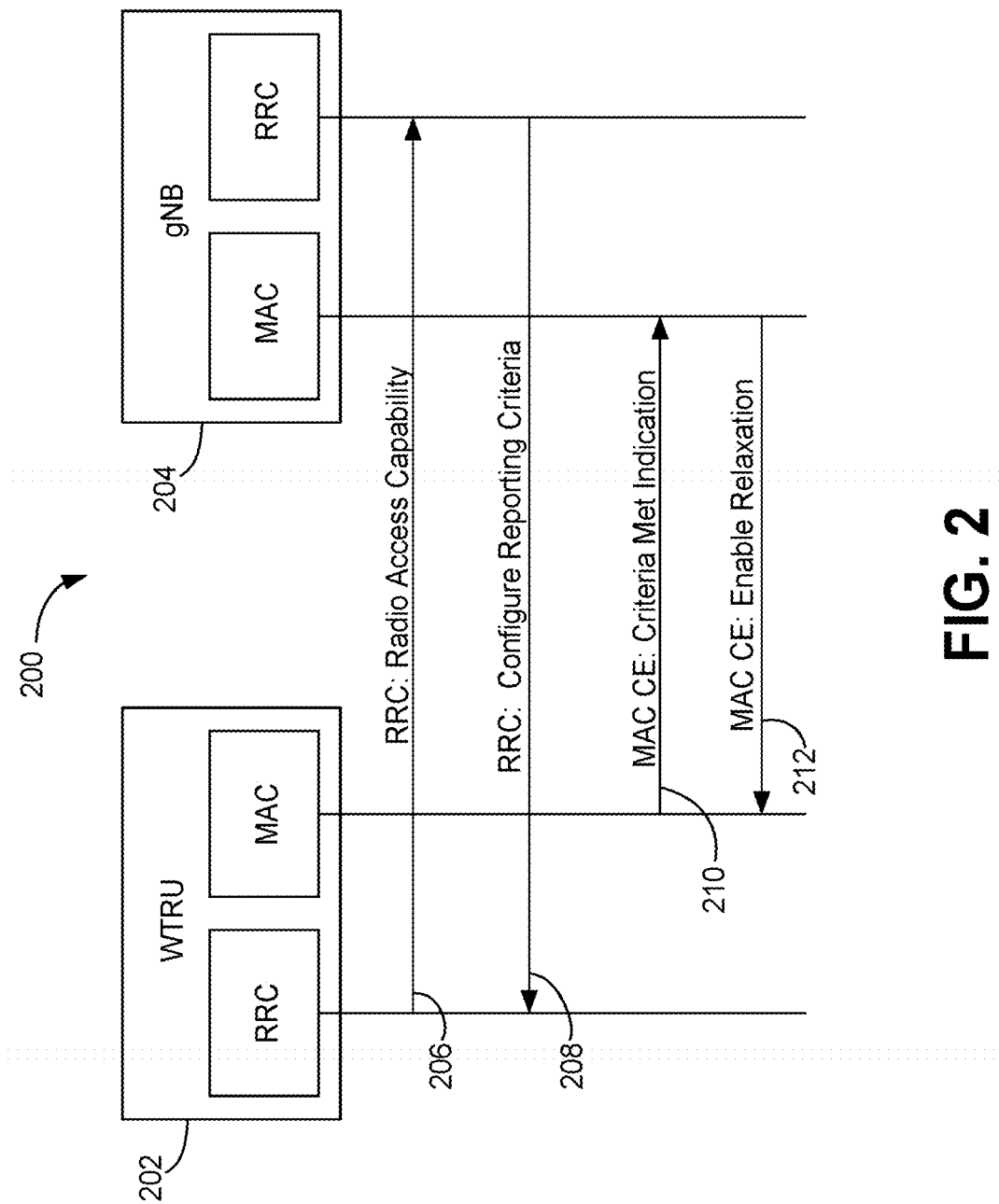
FIG. 2 illustrates an example of a signaling message sequence as it relates to relaxed operation.

FIG. 2 shows an example signaling message sequence 200. The WTRU 202 send RRC radio access capability to the gNB 204 at 206. At 208, the gNB 204 may configure reporting criteria using RRC signaling. At 210, when the criteria are met, the WTRU 202 may send an indication to the gNB 204. At 212, upon receiving an indication that the criteria are met, the gNB 204 may enable RLM/BFD relaxation.

Regarding the relaxation/reporting criteria, in examples, out-of-sync and in-sync block error rate (BLER) used for physical downlink control channel (PDCCH) mapping may be as shown in Table 1.

TABLE 1

Out-of-Sync and In-Sync block error rates

| Configuration | BLER$_{out}$ | BLER$_{in}$ |
|---|---|---|
| 0 | 10% | 2% |

In this example, the ratio between PDCCH resource elements (RE) energy to average secondary synchronization signal (SSS) RE energy is 4 dB and 0 dB for out-of-sync (OOS) and in-sync (IS), respectively. Thus, a 5 dB difference may be defined.

The radio link monitoring may have specific evaluation periods for non-DRX and DRX cases $T_{Evaluate\_out\_SSB}$ and $T_{Evaluate\_in\_SSB}$ specific for FR1 and FR2, respectively. In examples, the evaluation period based on SSB may be defined on CSI-RS as well. Thus, in the following examples the SSB reference may be used without reducing generality.

In examples, evaluation periods for OOS and IS may be valued as seen in Table 2. The example seen in Table 2 further considers FR1, where similar requirements may be applicable for CSI-RS.

TABLE 2

Evaluation Period $T_{Evaluate\_out\_SSB}$ and $T_{Evaluate\_in\_SSB}$ for FR1

| Configuration | $T_{Evaluate\_out\_SSB}$ (ms) | $T_{Evaluate\_in\_SSB}$ (ms) |
|---|---|---|
| no DRX | Max(200, Ceil(10 × P) × $T_{SSB}$) | Max(100, Ceil(5 × P) × $T_{SSB}$) |
| DRX cycle ≤320 ms | Max(200, Ceil(15 × P) × Max($T_{DRX}$, $T_{SSB}$)) | Max(100, Ceil(7.5 × P) × Max($T_{DRX}$, $T_{SSB}$)) |
| DRX cycle >320 ms | Ceil(10 × P) × $T_{DRX}$ | Ceil(5 × P) × $T_{DRX}$ |

NOTE:
$T_{SSB}$ is the periodicity of the SSB configured for RLM.
$T_{DRX}$ is the DRX cycle length.

As seen in Table 2, P is a factor that accounts for gaps overlapping and/or non-overlapping with the SSB related symbols and may take different values.

In examples, to perform RLM relaxation, the WTRU may use a first DRX cycle value to determine the requirements (e.g., the evaluation period) where the used DRX cycle value may be different than the value of the actual DRX cycle. For example, a scaling method may be used in which the first DRX cycle value may be determined by scaling the actual DRX cycle value (e.g., with an integer). The scaling factor, K, may be signaled by the network during RRC configuration. In examples, the scaling factor, K, may be signaled within the activation message. When the WTRU does not have a configured DRX cycle, the relaxation method and the first relaxation virtual DRX cycle for relaxed measurements may be configured semi-statically by the network into a RRC configuration. Further, the first relaxation virtual DRX cycle may be activated separately dynamically by MAC or DCI using PDCCH via an activation message.

In examples, the requirements may be scaled directly. For example, the evaluation period and/or the indication interval may be scaled with a scaling factor. Different requirements may be scaled with different scaling factors. The scaling factor(s) may be signaled by the network during RRC configuration. The scaling factor(s) may be signaled within the activation message.

In examples, the WTRU may use the value of a virtual DRX cycle while computing the RLM/BFD requirements, for example the evaluation period and/or the indication interval. The value of the virtual DRX cycle may be different than the actual DRX cycle (e.g., it may be larger). The virtual DRX cycle may be used when actual DRX is not configured. The possible set of values of the virtual DRX cycle may be configured by the base station (e.g., gNB). The specific value to use may be indicated by the base station within the activation message and/or it may be selected by the WTRU autonomously. For example, when indicated to enter the relaxed state, the WTRU may select one of the configured virtual DRX cycle values. This selection may be a first evaluation period that may be the lowest in a set of values signaled. Then, the WTRU may progressively increase the value (e.g., by choosing larger configured values).

Additionally and/or alternatively, the WTRU may follow base station instructions, for example UP or DOWN, while changing the virtual DRX cycle for RLM evaluation. The base station may send an UP or DOWN order according to reported cell/beam measurements, while the WTRU may be within the relaxation criteria condition. For example, if the WTRU is configured to be at the smallest configurable virtual DRX cycle and receives a DOWN command, then the WTRU may exit the RLM relaxation mode of operation. If the WTRU receives an UP command, following an even better cell/beam report (e.g. a report that indicates a higher beam RSRP than the previous report), the WTRU may move to a subsequent virtual DRX cycle in the configured list with a more relaxed measurement sampling for RLM.

Relaxation criteria for the RLM case may be a threshold defined as an offset to the OOS and/or IS SINR mappings. This may be, for example, a Y=2 dB offset against IS related SINR mapping for the serving cell good quality. This offset may be predefined, and/or a network configurable parameter. This offset may be uniquely defined relative to OOS or IS SINR mappings, and/or individually set or configured differently for each OOS and/or IS value. The RLM relaxation mode trigger may be based on measurements reaching and staying above this threshold for a certain amount of time. This time may be defined, e.g., configured semi-statically by network. This time may also be predefined.

Once the WTRU meets the conditions for low mobility based on the RSRP cell measurement variation over a certain time interval and the good cell quality in terms of RLM, the WTRU may report this favorable state of RLM/BFD relaxation to the network.

In examples, in addition to serving cell and low mobility criteria, relaxation criteria may include, e.g., a beam switch and/or a time to trigger (TTT). The beam change count may be detected in the WTRU or in the NW; e.g., in WTRU, beam(s) used for RSRP need to stay within a predefined time interval, t. The WTRU may report TTT criteria to be met for a time duration before triggering a report.

The relaxation criteria and reporting criteria may be separate. For example, the reporting criteria may use a lower threshold than the relaxation criteria. In examples, the WTRU may report an indication that reporting criteria is met. Upon reception of the report the NW may enable relaxation. The WTRU then may apply the actual relaxation when the relaxation criteria is met. DL control information may be received where the control information may have an activation indication.

The L1 (physical layer) indications interval for OOS and IS for non-DRX case may be configured as $T_{Indication\_interval}$ is max(10 ms, $T_{RLM-RS,M}$), where $T_{RLM,M}$ is the shortest periodicity of all configured RLM-RS resources for the monitored cell.

The L1 (physical layer) indications interval for OOS and IS for the DRX case may be configured as $T_{Indication\_interval}$ is Max(10 ms, 1.5×DRX_cycle_length, 1.5×$T_{RLM-RS,M}$) if the DRX cycle_length is less than or equal to 320 ms, and $T_{Indication\_interval}$ is the DRX_cycle_length if the DRX cycle_length exceeds 320 ms.

When the network activates the relaxation state, the WTRU may scale the $T_{Indication\_interval}$ according to the measurement sampling rate after applying the relaxation factor K. The relaxation factor K may be configured semi-statically by network or alternatively indicated by network at the relaxation state activation.

For example, one way of scaling the $T_{Indication\_interval}$ may be to use a virtual DRX relaxation cycle length. A virtual DRX relaxation cycle length may be defined as the sample measurements periodicity in the relaxation state. In this case the $T_{Indication\_interval}$ may be defined as: $T_{Indication\_interval}$: max(10 ms, virtual DRX relaxation cycle length, $T_{RLM-RS,M}$).

In examples, the $T_{Indication\_interval}$ may be defined as: $T_{Indication\_interval}$: max(10 ms, $R*T_{RLM-RS,M}$), where R is a scaling factor. If the scaling factor R is not an integer value, then the scaling factor R may be rounded up, e.g., by performing the ceiling operation such as ceil(R). The scaling factor R may not be an integer value when used to scale other measurements or thresholds for RLM Qin, Qout. The scaling factor R may be also related to the virtual DRX relaxation cycle length that may link the measurement opportunities for $T_{evaluate}$ periods. For example, virtual DRX relaxation cycle length may be defined as $R*T_{RLM-RS,M}$.

A WTRU capable of RLM/BFD the relaxation feature may be configured with one or more parameters. For example, the WTRU may be configured with the one or more parameters for relaxation via RRC signaling. The WTRU may receive a MAC CE that may configure the parameters for, for instance, by indicating a value from a set of predefined values. These predefined values may include, e.g., a relative threshold Y against the IS mapped threshold for serving cell good quality, TTT for signaling RLM/BFD relaxation ready state to the network, a counter for the IS over good quality offset threshold that may reset each time the WTRU samples a measurement below offset level, and/or TTT for signaling out of RLM/BFD relaxation state to the network that is signaled when the WTRU samples a measurement where an OOS is detected.

Additionally and/or alternatively, a sampled measurement and/or a defined number of samples falling below the IS normal operation threshold mapping may signal the relaxation state. Additionally and/or alternatively, a prohibit timer may prevent the WTRU from signaling RLM/BFD relaxation ready state after signaling an out of RLM/BFD relaxation state. The prohibit timer, which may track a prohibit time period, may be included with the configuration information. The configuration information may also indicate one or more prohibit time period(s).

The relaxation state feature may involve an uplink report, which may be approached in one or more ways. For example, the UL report may be reported in a MAC CE and/or in uplink control information (e.g., in PUCCH and/or PUSCH), in a scheduling request, and/or in a buffer status report. The UL report may contain a single bit to indicate that the criteria are met (e.g., SINR threshold and/or low mobility criteria). The base station may configure the reporting criteria. The UL report may contain multiple bits (e.g., 2 bits to separately indicate criteria). For example, 1 bit may indicate that the SINR threshold are met, and/or 1 bit may indicate that the low mobility criteria are met. The UL report may contain 2 or more bits to request to increase or decrease the level of relaxation. For example, the bits may indicate an increasing and/or decreasing of the virtual DRX cycle value used for RLM/BFD requirements in relaxed state. For example, the bits may indicate an indication of the value of the virtual DRX cycle used for RLM/BFD requirements in relaxed state.

In examples, the bits may be used to increase and/or decrease the threshold values and/or choose a threshold from a set of thresholds. What data the report indicates (e.g., the meaning of the codepoint contained in the report) may depend on whether NW has enabled and/or disabled relaxation. For example, if the NW has disabled relaxation, then the report may indicate whether threshold and low mobility criteria are met. If the NW has enabled relaxation, then the report may indicate whether threshold and low mobility criteria are no longer met. Moreover, if the NW has enabled relaxation, then the bits may be set according to a different threshold, or indicate to increase/decrease the threshold).

Concerning dual connectivity carrier aggregation (DCCA), reporting and/or enabling separately may be performed per serving cell and/or per serving beam. Additionally and/or alternatively, concerning DCCA, the WTRU may report results either to the master cell group (MCG) and/or the secondary cell group (SCG). This may also imply multiple bits to enable/disable. Moreover, reporting separately per carrier may imply multiple bits for the report.

In examples, a prohibit timer may be applied to the reporting trigger, e.g. the WTRU may be configured to start the prohibit time period when the WTRU sends the report (e.g., the report to either to the MCG and/or the SCG). After the WTRU exits relaxation, a timer may start and the WTRU may be prohibited to request relaxation via the UL report and/or enter relaxation while the timer is running. Additionally and alternatively, the WTRU may be prohibited from changing the relaxation state while the timer is running. The UL report may include whether the WTRU is or is not in the relaxed state. The UL report may include an indication of whether any OOS indication has been detected during the relaxed state. The UL report may include an indication of whether fallback and/or exiting relaxed state has occurred (e.g., whether WTRU is currently relaxed and whether criteria are met). A new RRC re-establishment cause value may be introduced to explicitly indicate radio link failure (RLF) during relaxation (e.g., serving and/or neighbor cell measurements, location information, and other information related to supporting a self-organizing network and/or minimization of drive testing).

For DL control, upon reporting RLM/BFD relaxation ready state to the network, the WTRU may receive an activation order. The activation order may simply activate the relaxation configuration already received by WTRU through a RRC configuration. Activation may mean, e.g., that the WTRU may start performing RLM/BFD in a relaxed state. Additionally and alternatively, the network may indicate in the activation order the value of the relaxation factor K and/or the value of the virtual DRX cycle that the WTRU may use. The relaxation factor K and/or the virtual DRX cycle value may be applied to the current evaluation period rules that, in turn, may affect the $TE_{valuate\_out}$ and $TE_{valuate\_n}$ values.

The DL control information may use a single bit to allow and/or disallow relaxation based on NW knowledge of deployment. For example, the DL may be configured to indicate "enable" only. In that example, the WTRU may autonomously indicate "disable" when the criteria are no longer met, and/or "exit" criteria are met (e.g., where the "exit" criteria specifies when the WTRU is expected to exit the relaxed state.)

The DL control information may indicate multiple relaxation requirements. For example, different requirements are needed to meet a SINR threshold and/or low mobility criteria. Usage of multiple bits may indicate these different requirements. In examples, a stepwise relaxation may be performed (e.g. the DL control information may indicate how much the may relax). The DL control information may indicate what requirements are applied (e.g. used with up and/or down request from WTRU, and/or incrementing and/or decrementing the relaxation factor K value).

For DL control, the WTRU may relax if both the NW indicates "allowed" and the criteria are met. In this case, different threshold(s) may exist for reporting and/or applying relaxation. These different thresholds may be achieved by applying an offset to the configured and/or predefined criteria, and/or by signaling separate thresholds. Additionally and/or alternatively, the use of separate thresholds may allow reporting to occur ahead of the criteria which allow the WTRU to relax. In this case, the use of separate thresholds can advantageously compensate for processing delay at the gNB, and/or for propagation delay in case of non-terrestrial networks (NTN)).

The DL control may have an additional state that NW indicates "allowed" even if criteria are not met and/or reported. The NW may base this additional state on, e.g., low mobility detected at the network. The indication, if based on beam switching, may be more accurate than cell quality measurement by WTRU.

For RLF, the WTRU (e.g., NR WTRU) may use a counter and/or timer, such as the counters N310, N311 and the timer T310 to determine when to declare RLF. For example, upon detecting N310 consecutive OOS indications from the physical layer, the WTRU may start a timer (e.g., T310). While T310 is running, the WTRU may attempt to re-synchronize to the current cell. For example, if the physical layer sends N311 consecutive IS indications, then the WTRU may stop T310 and consider itself back IS. If T310 expires before the physical layer sends N311 IS indications, then WTRU may considers RLF to have occurred. Further, the T310 may trigger an RRC re-establishment procedure.

While performing RLM using relaxed requirements, the WTRU may have its OOS and IS indication periods scaled accordingly, and thus the RLF detection may take longer. To address this situation and avoid network and/or WTRU performance issues, the T310 may be scaled. For example, the T310 may be scaled following the same scaling factor for DRX and/or indication to accommodate the same number (e.g., the T311 timer) of IS indications within the timer period T310. Additionally and alternatively, the T310 timer may be maintained with the same value and/or scale down the N310 counter to fit the OOS indications within the same amount of time, and may use regular or relaxed requirements. RLF conditions may scale the N311 counter such that the number of IS indications required to fulfil the "RLF recovery" conditions would be during the same T310 regardless of whether relaxed or regular monitoring requirements are used.

Additionally and alternatively, a WTRU that meets the RLF condition while using relaxed requirements may avoid declaring RLF at this time. Instead, such a WTRU may fallback autonomously to the normal operation mode for RLM and/or restart the RLM timers and counters, then only when the normal operation conditions for RLF are met may the WTRU declare RLF.

While references are made to specific counters and/or timers herein, these references are intended only for illustrative purposes, and the related methods and/or approaches may apply generally to any counter and/or timer.

For fallback related to the relaxation feature, beside signaling RLM/BFD relaxation ready state and/or out of RLM/BFD relaxation state, the WTRU may fallback automatically to the normal RLM/BFD procedures based on one or more conditions. These conditions include, e.g., the network configures a new measurement, the network configures a new measurement with gaps, a cell activation and/or deactivation in the same cell group, and/or bandwidth part activation or change, the WTRU receives a new RLM/BFD relaxation configuration, where upon receiving a new RLM/BFD configuration, the WTRU may have to restart the procedures for entering the relaxation ready state, the WTRU detects one or more OOS indications, and/or the WTRU detects that the condition for RLM/BFD relaxation state is no longer met and/or detects the exit condition and falls back to normal RLM/BFD operation. Additionally and alternatively, separate criteria may be used for entering and exiting the relaxed state, e.g., the relaxed state is enabled if the threshold and hysteresis are met, and the relaxed state is exited if below the threshold and/or with no hysteresis. Additionally and alternatively, separate criteria such as TTT may be applied to enter relaxation or to report the criteria, while exiting and/or fallback happens instantly.

Figure 3:
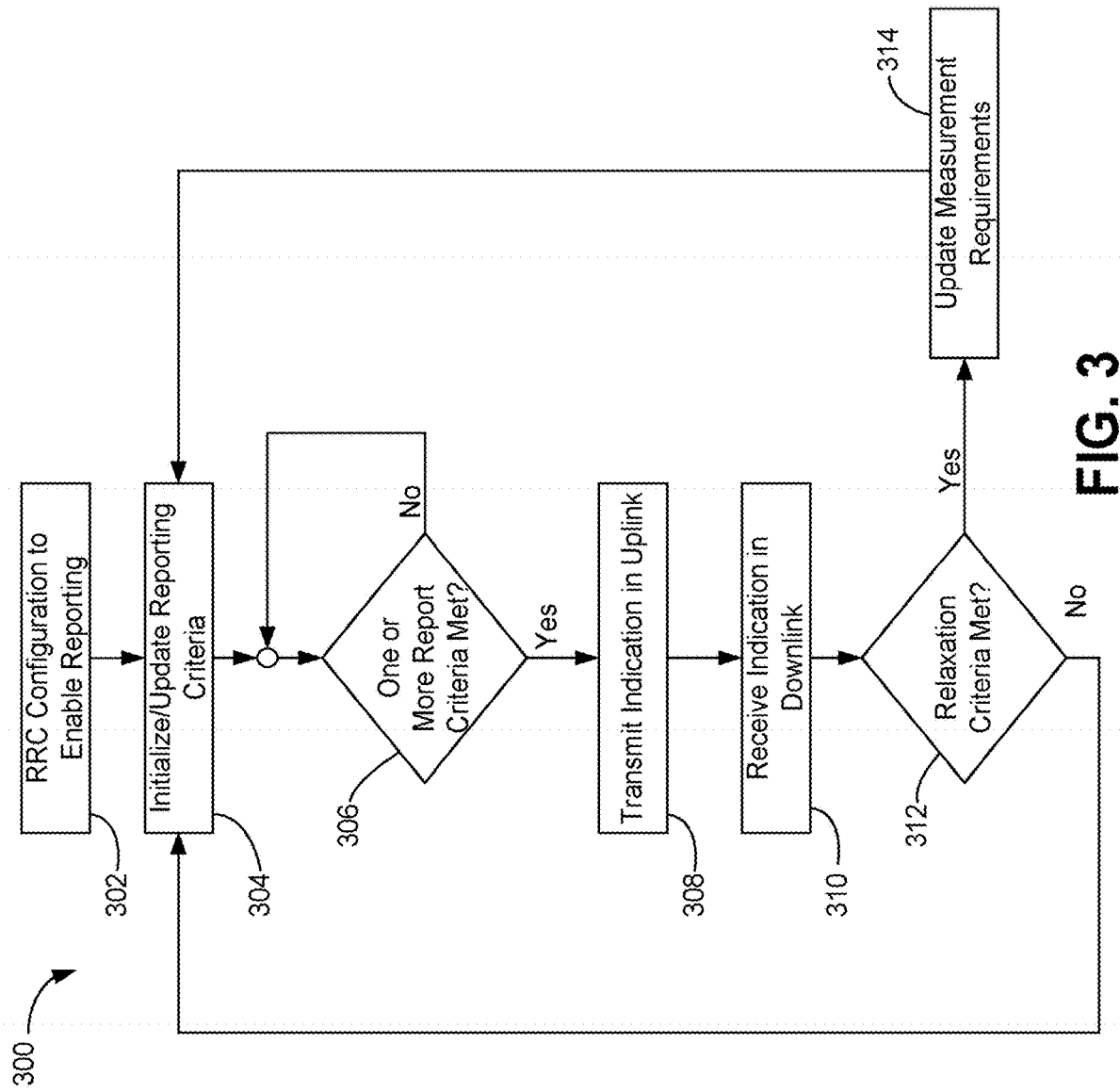
FIG. 3 illustrates an example flowchart showing a method for relaxation operation.

FIG. 3 illustrates an example flowchart 300 showing a method for relaxation operation. At 302, the WTRU may be configured by RRC signaling to enable reporting of RLM/BFD relaxation. The configuration may include an indication of an SINR threshold for determining serving cell quality, and/or a relative RSRP threshold and time period for determining low mobility. At 304, the reporting criteria may be initialized and/or updated to include serving cell quality and/or low mobility based on the configuration and predetermined rule(s). At 306, the WTRU may continuously and/or periodically evaluate the reporting criteria until one or more of the reporting criteria are met. At 308, the WTRU may transmit an uplink indication (e.g., in MAC CE) of whether the one or more criteria are met. At 310, the WTRU may receive a downlink indication (e.g., in MAC CE) as to whether and/or how the WTRU may relax its RLM/BFD requirements. At 312, the WTRU may determine whether the relaxation criteria are met. This may comprise of the value of the DL indication, and/or may include an indication of whether other criteria are met (e.g., serving cell quality and/or low mobility). At 314, the WTRU may update the measurement requirements in use. Then, at 314, the WTRU may proceed to update the reporting criteria based on the configuration and/or measurement requirements in use.

As described herein, a higher layer may refer to one or more layers in a protocol stack and/or a specific sublayer within the protocol stack. The protocol stack may comprise of one or more layers in a WTRU and/or a network node (e.g., eNB, gNB, other functional entity, etc.), where each layer may have one or more sublayers. Each layer and/or sublayer may be responsible for one or more functions. Each layer and/or sublayer may communicate with one or more of the other layers and/or sublayers, either directly and/or indirectly. In examples, these layers and/or sublayers may be numbered, such as, e.g., Layer 1, Layer 2, and Layer 3. For example, Layer 3 may comprise of one or more of the following, e.g., NAS, IP, and/or RRC. For example, Layer 2 may comprise of one or more of the following, e.g., packet data convergence control (PDCP), RLC, and/or MAC. For example, Layer 3 may comprise of physical (PHY) layer type operations. The greater the number of the layer, the higher it is relative to other layers (e.g., Layer 3 is higher than Layer 1).

In examples, the aforementioned examples may be called layers and/or sublayers themselves irrespective of layer number, and may be referred to as a higher layer as described herein. For example, from highest to lowest, a higher layer may refer to one or more of the following layers/sublayers, e.g. a NAS layer, a RRC layer, a PDCP layer, a RLC layer, a MAC layer, and/or a PHY layer. Any reference herein to a higher layer in conjunction with a process, device, or system may refer to a layer that is higher than the layer of the process, device, or system. In examples, reference to a higher layer herein may refer to a function or an operation performed by one or more layers described herein. In examples, reference to a higher layer herein may refer to information sent and/or received by one or more layers described herein. In examples, reference to a higher layer herein may refer to a configuration sent and/or received by one or more layers described herein.

Figure 4:
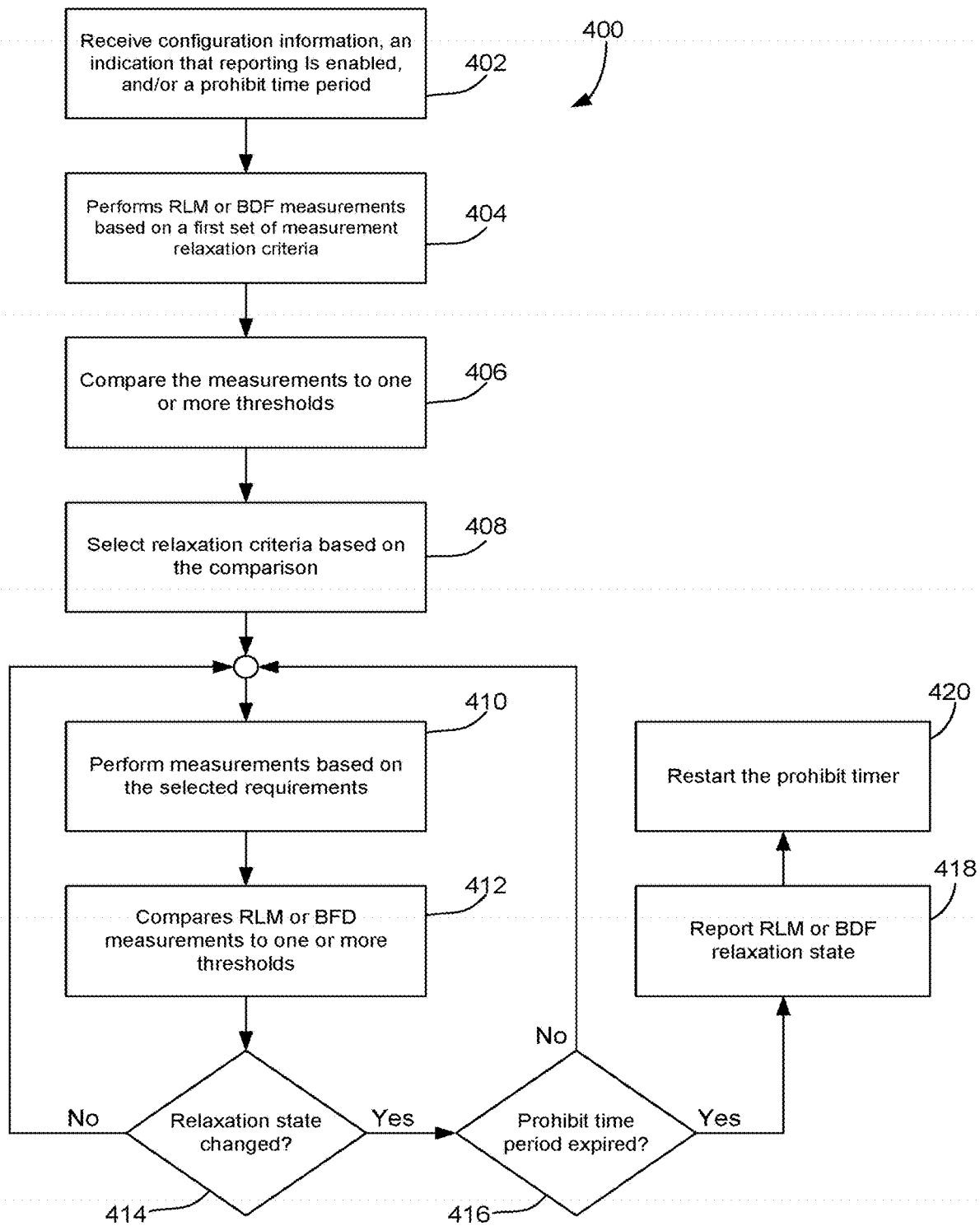
FIG. 4 illustrates an example flowchart showing a procedure performed by a WTRU to determine measurements based on relaxation criteria, when to enter (or exit) the relaxation state, and how to report to the network and/or cell when it has entered (or exited) the relaxation state.

FIG. 4 illustrates an example flowchart showing a procedure 400 that may be performed by a WTRU to determine measurements based on relaxation criteria, when to enter (or exit) the relaxation state, and how to report to the network and/or cell when it has entered (or exited) the relaxation state. At 402, the WTRU may receive configuration information. The configuration information may include any combination of measurement relaxation criteria (e.g., a first set of relaxation criteria) for RLM or BDF, an indication that reporting to the cell is enabled, and/or a prohibit time period. After receiving the configuration information, the WTRU, at 404, may perform measurements based on (e.g., using) the first set of relaxation criteria (e.g., a first evaluation period and/or a first periodicity). The measurements may include L3 RSRP measurement variation and/or the related RS measurements for the L3 RSRP measurement.

At 406, the WTRU may compare the measurements to one or more thresholds. The thresholds may include one or more of a power threshold and/or a mobility threshold (e.g., such as an SINR threshold, RSRP threshold, RSSI threshold, RSRQ threshold and/or low mobility criteria, such as change of RSRP within a specific time limit, and/or a cell change count).

At 408, the WTRU may select a set of relaxation criteria (e.g., the first set of relaxation criteria or a second set of relaxation criteria) based on the comparison between the measurements taken using the first set of relaxation criteria and the one or more thresholds. For example, if the measurements are above the one or more thresholds, the WTRU may select the first set of relaxation criteria, and if the measurements are below the one or more thresholds, the WTRU may select the second set of relaxation criteria. The second relaxation criteria may include a second evaluation period and/or a second periodicity (e.g., which may be different from the first evaluation period and/or the first periodicity). In some examples, the WTRU may use the first relaxation criteria when the WTRU is not in a measurement relaxation state and may use the second relaxation criteria when the WTRU is in the measurement relaxation state, or vice versa.

At 410, the WTRU may perform measurement based on the set of relaxation criteria that was selected at 408. At 412, the WTRU may compare the measurements performed at 410 to the one or more threshold, for example, to determine whether a relaxation state change has occurred (e.g., so that the WTRU may determine whether to change into or out of the measurement relaxation state). The WTRU may use different relaxation criteria when in the measurement relaxation state as compared to when the WTRU is not in the measurement relaxation state. At 414, the WTRU may determine whether the WTRU has changed relaxation states, for example, based on the comparison performed at 412. If the WTRU determines the relaxation state has not changed, the WTRU may return to 410 and compare measurements taken using the set of relaxation criteria selected to the one or more thresholds.

If the WTRU determines the relaxation state has changed, the WTRU may determine whether a prohibit time period has expired (e.g., whether a prohibit timer is running) at 416. As described in more detail herein, the WTRU may be configured to start a prohibit timer based on the prohibit time period that is received in the configuration information at 402. For instance, the WTRU may be configured to start the prohibit timer in response to sending a report (e.g., the UL report) to the network that indicates the measurement relaxation state of the WTRU (e.g., whether the WTRU has entered or exited the measurement relaxation state), which for instance may occur at 418. If the WTRU determines that the prohibit time period has not expired at 416, the WTRU may return to 410 and compare measurements taken using the set of relaxation criteria selected to the one or more thresholds.

If the WTRU determines that the prohibit time period has expired, the WTRU may send a report to the network that it has entered (or exited) the relaxation state at 418. For instance, if the WTRU determines that the prohibit time period has expired, the WTRU may change its measurement relaxation state. In some examples, the WTRU may report a measurement relaxation state indication when the relaxation state has changed, status reporting is enabled, and/or a prohibit timer is not running. By informing the network and/or cell when the WTRU has entered and/or exited the relaxation state, the network and/or cell may know when conditions are best and/or when the WTRU may react quickly or slowly.

At 420, after the WTRU sends the report, the WTRU may restart the prohibit timer. In examples, the WTRU may start the prohibit time period when the WTRU sends the report (e.g., the UL report). In some examples, the WTRU may select a set of relaxation criteria for performing measurements (e.g., the first set of relaxation criteria when the WTRU is not in the relaxation state, or the second set of relaxation criteria when the WTRU is in the relaxation state), and then return to 410. The use of the prohibit time period may, for example, prevent the WTRU from entering and exiting the relaxation state too often and/or in turn, reduce the number of reports (e.g., UL reports) the WTRU sends to the network.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a processor and memory, the processor and memory configured to:
receive a first radio resource control (RRC) message comprising configuration information, the configuration information indicating measurement relaxation criterion for measurements associated with radio link monitoring (RLM) or beam failure detection (BFD) and a value for a prohibit timer associated with reporting a measurement relaxation state;
determine that the WTRU is to operate in a measurement relaxation state for at least one serving cell based on the measurement relaxation criterion being satisfied for the at least one serving cell, wherein the measurement relaxation state is associated with a changed measurement evaluation period than a measurement evaluation period of a non-relaxed measurement state;
send a second RRC message comprising a first report, the first report indicating that the WTRU is operating in the measurement relaxation state for the at least one serving cell, wherein the first report includes a respective indication of a respective measurement relaxation state information for each of a plurality of serving cells;
start the prohibit timer based on determining that the WTRU is to operate in the measurement relaxation state when sending the first report;
determine that the measurement relaxation state of the WTRU has changed for the at least one serving cell based on the measurement relaxation criterion not being satisfied for the at least one serving cell;
determine that the prohibit timer is not running;
send a third RRC message comprising a second report, wherein the second report is sent based on the determination that the measurement relaxation state has changed and the determination that the prohibit timer is not running, wherein the second report includes an indication of the changed measurement relaxation state for the at least one serving cell of the plurality of serving cells; and
start the prohibit timer based on determining that the WTRU is to operate in the changed measurement relaxation state when sending the second report.

2. The WTRU of claim 1, wherein the measurement relaxation criterion comprises an offset applied to in-sync measurement criteria for the at least one serving cell.

3. The WTRU of claim 1, wherein the measurement relaxation criterion comprises a low mobility criterion.

4. The WTRU of claim 3, wherein the low mobility criterion is associated with a reference signal received power threshold.

5. The WTRU of claim 1, wherein the measurement relaxation criterion is evaluated during an evaluation period.

6. The WTRU of claim 1, wherein the changed measurement relaxation state for the at least one serving cell corresponds to a non-relaxed measurement state.

7. The WTRU of claim 6, wherein the non-relaxed measurement state corresponds to a normal mode for the measurements associated with RLM or BFD.

8. The WTRU of claim 1, wherein the first report indicates that the WTRU is operating in the measurement relaxation state for the at least one serving cell by setting a bit to a value that indicates that the measurement relaxation criterion is satisfied for the at least one serving cell.

9. A method implemented by a wireless transmit/receive unit (WTRU), the method comprising:
receiving a first radio resource control (RRC) message comprising configuration information, the configuration information indicating measurement relaxation criterion for measurements associated with radio link monitoring (RLM) or beam failure detection (BFD) and a value for a prohibit timer associated with reporting a measurement relaxation state;
determining that the WTRU is to operate in a measurement relaxation state for at least one serving cell based on the measurement relaxation criterion being satisfied for the at least one serving cell, wherein the measurement relaxation state is associated with a changed measurement evaluation period than a measurement evaluation period of a non-relaxed measurement state;
sending a second RRC message comprising a first report, the first report indicating that the WTRU is operating in the measurement relaxation state for the at least one serving cell, wherein the first report includes a respective indication of a respective measurement relaxation state information for each of a plurality of serving cells;

starting the prohibit timer based on determining that the WTRU is to operate in the measurement relaxation state when sending the first report;

determining that the measurement relaxation state of the WTRU has changed for the at least one serving cell based on the measurement relaxation criterion not being satisfied for the at least one serving cell;

determining that the prohibit timer is not running;

sending a third RRC message comprising a second report, wherein the second report is sent based on the determination that the measurement relaxation state has changed and the determination that the prohibit timer is not running, wherein the second report includes an indication of the changed measurement relaxation state for the at least one serving cell of the plurality of serving cells; and starting the prohibit timer based on determining that the WTRU is to operate in the changed measurement relaxation state when sending the second report.

10. The method of claim 9, wherein the measurement relaxation criterion comprises an offset applied to in-sync measurement criterion for the at least one serving cell.

11. The method of claim 9, wherein the measurement relaxation criterion comprises a low mobility criterion.

12. The method of claim 11, wherein the low mobility criterion is associated with a reference signal received power threshold.

13. The method of claim 9, wherein the measurement relaxation criterion is evaluated during an evaluation period.

14. The method of claim 9, wherein the changed measurement relaxation state for the at least one serving cell corresponds to a non-relaxed measurement state.

15. The method of claim 14, wherein the non-relaxed measurement state corresponds to a normal mode for the measurements associated with RLM or BFD.

16. The method of claim 9, wherein the first report indicates that the WTRU is operating in the measurement relaxation state for the at least one serving cell by setting a bit to a value that indicates that the measurement relaxation criterion is satisfied for the at least one serving cell.

17. The WTRU of claim 1, wherein the processor and memory are further configured to:

receive a possible set of values for a virtual discontinuous reception (DRX) cycle and an activation message;

select a first value of a virtual DRX cycle from the possible set of values based on the activation message;

determine a first radio link monitoring (RLM) or a first beam failure detection (BFD) requirements based on the first value of a virtual DRX cycle;

select one or more subsequent values of a possible set of values for a virtual DRX cycle, the one or more subsequent values based on the first value, wherein the each of the selected one or more subsequent values is greater than the value selected before it; and determine a second RLM or a second BFD requirement based on the one or more selected subsequent values.

18. The method of claim 9, further comprising:

receiving a possible set of values for a virtual discontinuous reception (DRX) cycle and an activation message;

selecting a first value of a virtual DRX cycle from the possible set of values based on the activation message;

determining a first radio link monitoring (RLM) or a first beam failure detection (BFD) requirements based on the first value of a virtual DRX cycle;

selecting one or more subsequent values of a possible set of values for a virtual DRX cycle, the one or more subsequent values based on the first value, wherein the each of the selected one or more subsequent values is greater than the value selected before it; and determining a second RLM or a second BFD requirement based on the one or more selected subsequent values.

\* \* \* \* \*

UNITED STATES PATENT AND TRADEMARK OFFICE
CERTIFICATE OF CORRECTION

PATENT NO. : 12,262,239 B2
APPLICATION NO. : 18/678534
DATED : March 25, 2025
INVENTOR(S) : Martin et al.

Page 1 of 1

It is certified that error appears in the above-identified patent and that said Letters Patent is hereby corrected as shown below:

In the Claims

In Claim 2: Column 24, Line 25, delete "criteria," and insert -- criterion --

Signed and Sealed this
Twenty-ninth Day of April, 2025

Coke Morgan Stewart
*Acting Director of the United States Patent and Trademark Office*